UNITED STATES PATENT OFFICE.

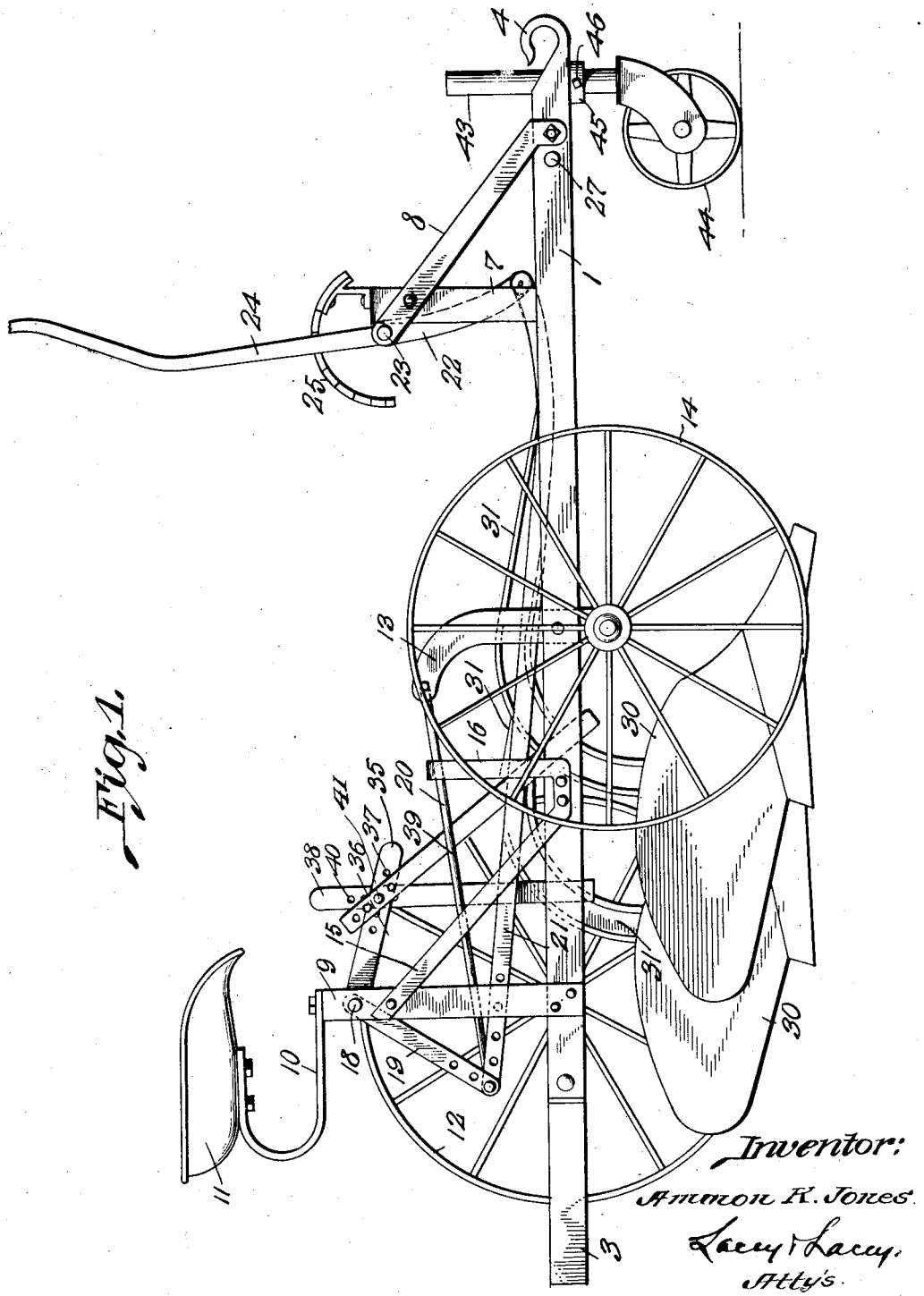

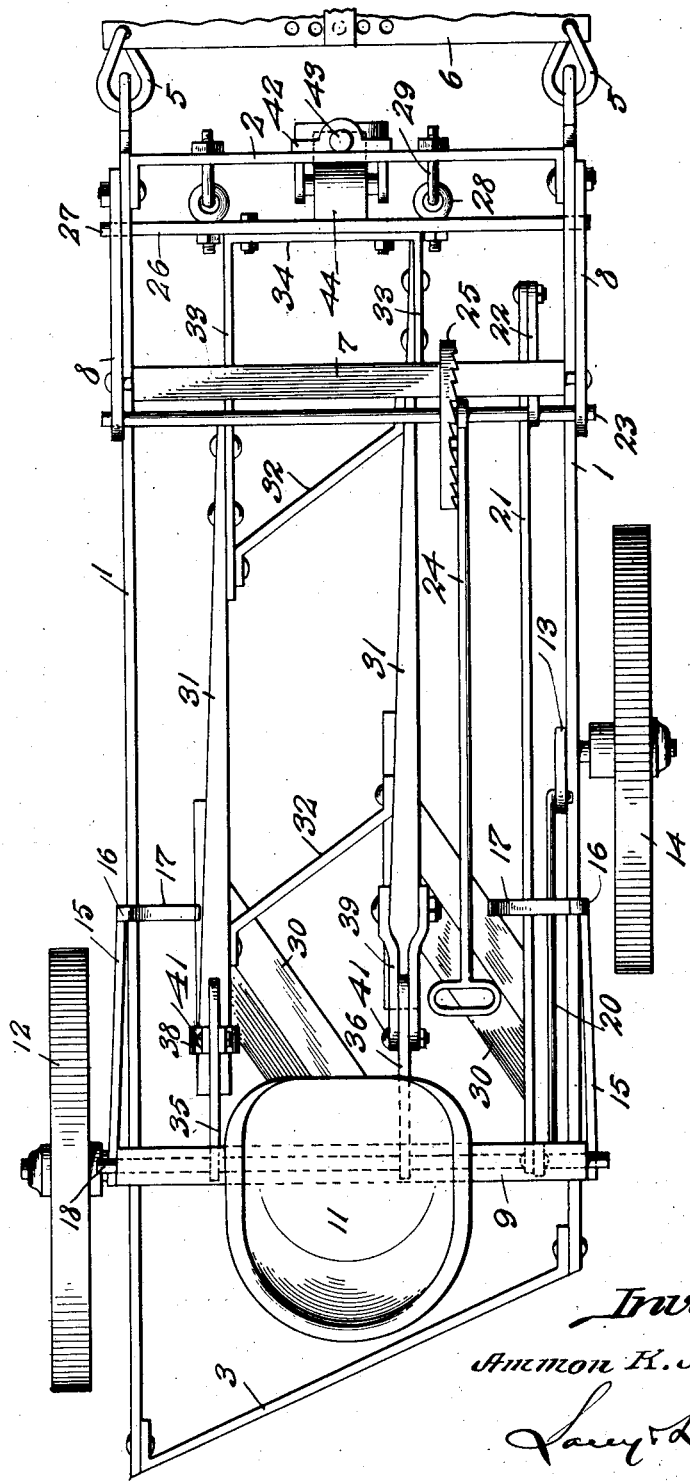

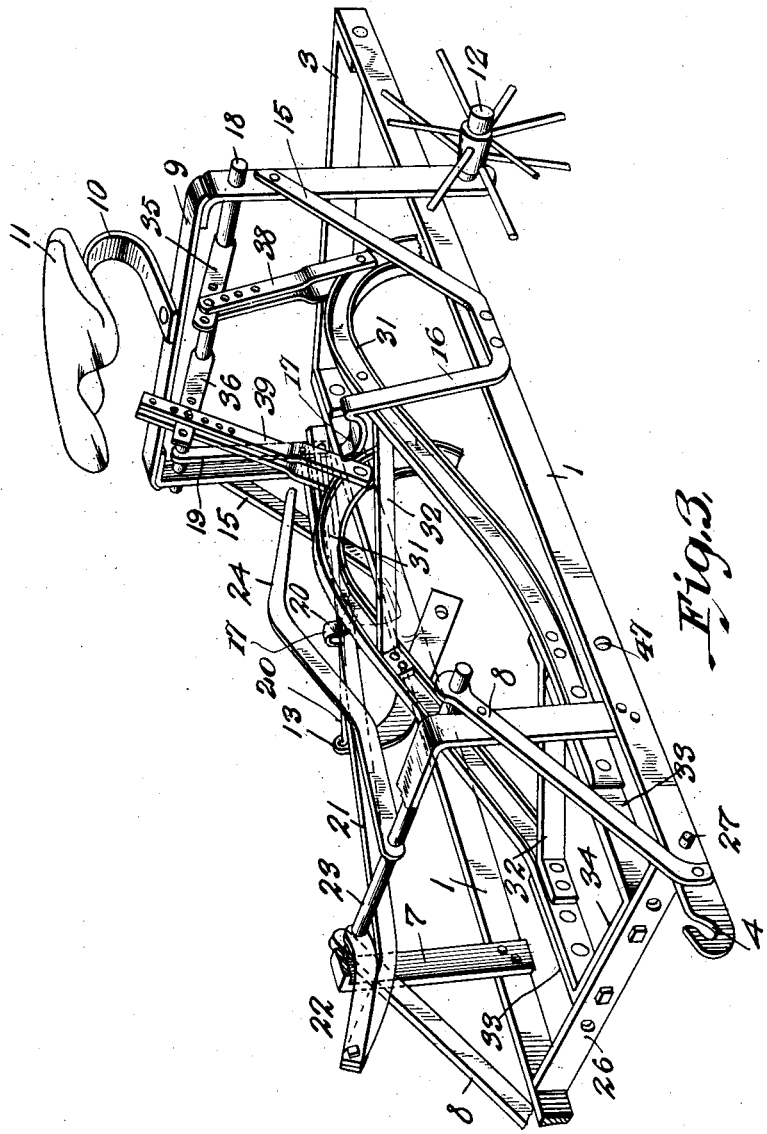

AMMON K. JONES, OF NEOSHO, MISSOURI.

PLOW.

1,348,219.  Specification of Letters Patent.  Patented Aug. 3, 1920.

Application filed April 26, 1919. Serial No. 292,811.

*To all whom it may concern:*

Be it known that I, AMMON K. JONES, a citizen of the United States, residing at Neosho, in the county of Newton and State of Missouri, have invented certain new and useful Improvements in Plows, of which the following is a specification.

The object of this invention is to provide means whereby a plurality of plows may be readily drawn over a field and may be set to run any desired depth or may be raised and supported entirely clear of the surface. The invention is illustrated in the accompanying drawings and will be hereinafter fully described.

In the drawings:

Figure 1 is a side elevation of a plow embodying my improvements;

Fig. 2 is a plan view of the same;

Fig. 3 is a perspective view of the supporting frame and operating parts, some parts being broken away and the wheels being removed.

The frame consists of side bars 1 connected at their ends by a front cross bar 2 and a rear cross bar 3, the front extremities of the side bars being formed into hooks 4 which are engaged by clevises 5 at the ends of a draft bar or evener 6. Near the front ends of the side bars, I secure an arch 7 which is connected by braces 8 with the side bars so as to effectually withstand the strain to which it is subjected. A similar arch 9 is secured upon the side bars near the rear ends thereof and upon the top of said arch I secure a spring 10 carrying a seat 11 for the driver. At the left side of the frame and preferably at the lower end of the arch 9, I mount a ground wheel 12 which, when the plow is in use, will run upon the surface of the unplowed ground. At the opposite side of the frame and in advance of the wheel 12 I pivotally mount upon the adjacent side bar a lever or swinging arm 13 which carries a furrow wheel 14 at its lower end and it will be readily understood that by swinging the said supporting arm 13 the furrow wheel may be set to run at a desired depth and travel in a previously formed furrow. Inclined braces 15 connect the sides of the arch 9 with the adjacent side bars of the frame and the forward ends of these braces are preferably formed integral with short standards 16 having foot rests 17 at their upper ends.

A rock shaft 18 is journaled in the sides of the arch 9 near the top thereof and formed rigidly or integral with the said rock shaft is a crank arm or lever 19, the lower end of which is connected by a link 20 with the upper end of the swinging arm 13. It will thus be seen that when the shaft 18 is rocked the arm 13 will be vibrated so that the furrow wheel may be raised or lowered. A connecting rod 21 is pivoted at its rear end to the lower end of the crank arm or lever 19 and the front end of said connecting rod is pivoted to the lower end of a crank arm 22 secured rigidly to or formed integral with a rock shaft 23 which is mounted in the ends of the braces 8. An operating lever 24 is formed integral with or secured rigidly to the rock shaft 23 and this lever should be long enough to be easily reached by a driver upon the seat 11. A rack 25 is secured upon the arch 7 and is engaged by the said lever 24 so that it will be held in a set position and the plows thereby supported and held against dropping after they have been raised.

A cross bar 26 is provided with trunnions 27 at its ends and these trunnions are journaled in the side bars 1 of the frame, interengaging eye-bolts 28 and 29 being secured in the said cross bar and the cross bar 2 so that buckling of the bar 26 will be prevented and it will be given sufficient play to rotate or rock as the plows are raised or lowered. The plows 30 may be of any well known form and I have illustrated the ordinary turning plows. Two plows are carried by the frame, the beams 31 of the plows being disposed between the side bars 1 of the frame and connected by braces 32 so that they will be held in the proper spaced and parallel relation. The forward ends of the beams 31 are secured to the rearwardly projecting side arms 33 which extend from a head bar or bracket 34 which is secured rigidly to the tiltable cross bar 26, as clearly shown in Fig. 2. In the vertical planes of the respective plow beams, I provide upon the rock shaft 18 the crank arms or levers 35 and 36 which are each provided with a plurality of openings 37 therethrough. Links or hangers 38 and 39 are pivoted at their lower ends to the respective plow beams and are provided in their upper portions with openings 40 through which and corresponding openings of the respective levers or cranks 35, 36, pivot pins or bolts 41 are inserted so as to connect the plow beams with the rock shaft by foldable suspension devices. By reference to Fig. 1, it will be noted that when the plows are lowered the lever 36 and the hanger or link 39 will define a wide obtuse angle so that they will tend to lock the plows to the work, thereby relieving the rack 25 and the lever 24 of holding strain. When the plows are to be raised, the shaft 18 is rocked through the connections between the same and the lever 24 and the crank or lever arm 35 will act directly to lift the plows and will thereby overcome the locking of the joint between the members 36 and 39 so that no special effort will be required to release the plows from the locked position but until the actuating impulse is applied to the hand lever 24 the plows will be held firmly to the work.

Upon the front cross bar 2 and preferably at the center of the same is a journal box 42 in which is rotatably mounted a vertical spindle 43 having a runner or gage wheel 44 mounted upon its lower end. A collar 45 is fitted upon the spindle 43 below the bearing 42 and is adjustably secured to the spindle by a set screw 45 so that by securing the collar at the proper point of the spindle the front end of the frame will be supported at the proper height above the surface of the ground and downward tilting of the frame will be prevented, the draft animals being thus relieved of annoying and chafing wear upon their necks.

It will be readily seen from the foregoing description, taken in connection with the accompanying drawings, that I have provided a very simple and efficient truck or wheeled frame whereby a plurality of plows may be drawn over a field and may be very easily and quickly raised above the surface of the ground or lowered to form furrows. The furrow wheel will be raised or lowered simultaneously with the raising or lowering of the plows and separate adjustment of the wheel is unnecessary so that the wheel will be accurately set at the same depth as the plows and consequently will run on the bottom of a formed furrow and maintain the level position of the frame. If the hand lever 24 be swung downwardly and rearwardly the crank arm 22 will, of course, swing upwardly and forwardly and will pull upon the connecting rod 21 so as to swing the crank arm 19 forwardly and thereby rock the shaft 18 so that the plows will be raised. At the same time the link 20 will be pushed forwardly by the arm 19 and the pivoted wheel-carrying arm 13 will be swung forwardly so that the wheel 14 will swing rearwardly and upwardly. A comparatively short movement of the lower end of the arm 13 will suffice to raise the furrow wheel out of the furrow and the machine may then be drawn over a road or from one field to another field without the plows engaging the surface. If the lever 24 be swung upwardly and forwardly the weight of the plows and the connected parts will carry them positively downward so that they may perform the required work. While my truck is composed of a minimum number of parts, it is very strong and durable and will effectually sustain the weight of the plows and withstand the strains to which it will be subjected.

It is to be understood that the illustrated arrangement may be utilized as a basal unit for a gang of plows of any desired number developed by adding similar frames or units each containing two plows. In adding a frame the right hand side bar of the frame to be added is omitted and said frame is arranged with its rear cross bar in line with the rear cross bar of the basal unit or frame so that it may be bolted to the left hand side bar of the basal frame. The right hand end of the arch 7 of the second frame may be secured by a bolt inserted through an opening 47 in the adjacent side bar of the basal frame and the front cross bar of the second frame will be secured by the bolts which secure the arch 7 of the basal frame. The ground wheel 12, of course, is shifted to the left hand side of the second frame but, otherwise, the units are identical.

Having thus described my invention what is claimed as new is:

1. The combination with a wheeled frame having a rigid cross bar at its front end, a second cross bar mounted for rocking movement in the sides of the frame in rear of and adjacent the rigid cross bar, flexible connections between the said cross bars, plows secured rigidly at their front ends to the said rear cross bar, and means on the frame connected with the plows to raise or lower the same.

2. The combination of a wheeled frame, arches erected thereon near the front and rear ends thereof, rock shafts mounted upon the respective arches, plows disposed within the frame and having their front ends connected therewith for rocking movement, an operating lever on the forward rock shaft, link connections between the two rock shafts, and link connections between the rear rock shaft and the plows.

3. The combination of a wheeled frame, plows supported within the frame for rocking movement at their front ends, one plow being in advance of another plow, a rock shaft mounted upon the frame near the rear end thereof, means for rocking said shaft, and separate foldable suspension devices connecting the respective plows with said shaft.

4. The combination of a frame, a wheel having a fixed bearing at one side of said frame, a rocking supporting arm mounted on the opposite side of the frame, a wheel carried by said arm, a rock shaft mounted upon the frame, a lever extending from said shaft, a link connecting said lever with the swinging supporting arm, plows mounted within the frame, toggle connections between the rock shaft and the plows, and means for rocking said shaft whereby the plows and the wheel on the rocking supporting arm will be simultaneously raised or lowered.

5. The combination of a rectangular rigid frame, a cross bar journaled at its ends in the sides of said frame near the front end thereof, a bracket secured rigidly to said cross bar and having rearwardly extending side bars, plows secured rigidly at their front ends to the side bars of said bracket, a rock shaft mounted on the rear portion of the frame, toggle connections between said rock shaft and the respective plows, and means for rocking the shaft.

6. The combination of a supporting frame, rock shafts mounted upon the frame near the front and rear ends thereof, plows supported at their front ends within the frame for rocking movement, an operating lever secured to the front rock shaft, a crank on said front rock shaft, a crank on the rear rock shaft, a link connecting said cranks, and toggle connections between the rear rock shaft and the plows.

In testimony whereof I affix my signature.

AMMON K. JONES. [L. S.]